United States Patent
Johnsen et al.

(10) Patent No.: US 12,326,036 B2
(45) Date of Patent: Jun. 10, 2025

(54) VIG UNIT WITH TEMPORARY EVACUATION GAP IN PERIMETER SEAL

(71) Applicant: VKR HOLDING A/S, Hørsholm (DK)

(72) Inventors: Simon Johnsen, Hørsholm (DK); Thomas Lind Madsen, Hørsholm (DK); Søren Vejling Andersen, Hørsholm (DK); Annette Johncock Krisko, Hørsholm (DK); Utku Ahmet Özden, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 471 days.

(21) Appl. No.: 17/417,888

(22) PCT Filed: Jan. 20, 2020

(86) PCT No.: PCT/DK2020/050021
§ 371 (c)(1),
(2) Date: Jun. 24, 2021

(87) PCT Pub. No.: WO2020/151794
PCT Pub. Date: Jul. 30, 2020

(65) Prior Publication Data
US 2022/0074260 A1    Mar. 10, 2022

(30) Foreign Application Priority Data
Jan. 22, 2019   (DK) .............................. PA201970045

(51) Int. Cl.
*E06B 3/673* (2006.01)
*E06B 3/66* (2006.01)
(Continued)

(52) U.S. Cl.
CPC .......... *E06B 3/6736* (2013.01); *E06B 3/6612* (2013.01); *E06B 3/66333* (2013.01);
(Continued)

(58) Field of Classification Search
None
See application file for complete search history.

(56) References Cited

U.S. PATENT DOCUMENTS

| | | | |
|---|---|---|---|
| 2011/0123733 A1 | 5/2011 | Yang | |
| 2014/0087099 A1* | 3/2014 | Veerasamy | ............. C03C 27/08 156/64 |
| 2019/0084877 A1* | 3/2019 | Abe | ..................... E06B 3/66342 |

FOREIGN PATENT DOCUMENTS

| | | |
|---|---|---|
| CH | 210554 | 10/1940 |
| CN | 106379009 A | 2/2017 |

(Continued)

OTHER PUBLICATIONS

WO-2017169252 machine translation, Abe et al., Glass Panel Unit Manufacturing Method, Oct. 2017 (Year: 2017).*

(Continued)

*Primary Examiner* — Queenie S Dehghan
(74) *Attorney, Agent, or Firm* — CANTOR COLBURN LLP

(57) ABSTRACT

A method of manufacturing a glass sheet assembly for a vacuum insulated glass unit includes applying an edge seal made of a first material to a perimeter of a first surface of a first glass sheet. The edge seal defining a discontinuity. The method also includes disposing a first surface of a second glass sheet on the edge seal such that a gap is defined between the first surface of the first glass sheet and the first surface of the second glass sheet. The method further includes evacuating the gap through the discontinuity and locally heating the edge seal to at least partially seal the discontinuity.

8 Claims, 2 Drawing Sheets

(51) Int. Cl.
  *E06B 3/663* (2006.01)
  *E06B 3/677* (2006.01)
(52) U.S. Cl.
  CPC ........ *E06B 3/66357* (2013.01); *E06B 3/6733* (2013.01); *E06B 3/6775* (2013.01); *E06B 2003/66338* (2013.01)

(56) References Cited

FOREIGN PATENT DOCUMENTS

| KR | 20180003095 A | 1/2018 | | |
|---|---|---|---|---|
| WO | 9102878 A1 | 3/1991 | | |
| WO | 0134932 A1 | 5/2001 | | |
| WO | WO-2007089096 A1 * | 8/2007 | ............. | E04B 1/803 |
| WO | 2009003506 A1 | 1/2009 | | |
| WO | 2017169252 A1 | 10/2017 | | |

OTHER PUBLICATIONS

WO 2009003506 machine translation, Jaeger Steffen, Thermally Insulating Glazing Element and Method for Producing It, Jan. 2009 (Year: 2009).*
JP H1195230 machine translation, Yokozeki, Makoto, Production of Liquid Crystal Panel, Apr. 1999 (Year: 1999).*
International Search Report for corresponding application PCT/DK2020/050021 filed Jan. 20, 2020; Mail date Apr. 20, 2020.
Written Opinion for corresponding application PCT/DK2020/050021 filed Jan. 20, 2020; Mail date Apr. 20, 2020.
European Search Report for corresponding application EP20702190.8; Report dated Apr. 15, 2024.

* cited by examiner

US 12,326,036 B2

VIG UNIT WITH TEMPORARY EVACUATION GAP IN PERIMETER SEAL

BACKGROUND

The present disclosure relates to vacuum insulated glass unit in a method of manufacturing a vacuum insulated glass unit.

Vacuum insulated glass units generally include two glass panes or sheets that are spaced apart from each other by support structures that are distributed between the pains or sheets. A gap is defined between the two glass panes or sheets and is evacuated to provide an insulating gap to improve the performance of the vacuum insulated glass unit. The gap may be evacuated through a port that may be visible or detected in the final product.

SUMMARY

Disclosed is a method of manufacturing a glass sheet assembly for a vacuum insulated glass unit. The method includes applying an edge seal made of a first material to a perimeter of a first surface of a first glass sheet, the edge seal defining a discontinuity; disposing a plurality of support structures on the first surface of the first glass sheet; and positioning a first surface of a second glass sheet relative to the first surface of the first glass sheet, such that the first surface of the second glass sheet engages the edge seal defining the discontinuity and a gap is defined between the first surface of the first glass sheet and the first surface of the second glass sheet. The discontinuity being fluidly connected to the gap.

Also disclosed is a method of manufacturing a glass sheet assembly for a vacuum insulated glass unit. The method includes applying an edge seal made of a first material to a perimeter of a first surface of a first glass sheet. The edge seal defining a discontinuity. The method also includes disposing a first surface of a second glass sheet on the edge seal such that a gap is defined between the first surface of the first glass sheet and the first surface of the second glass sheet. The method further includes evacuating the gap through the discontinuity and locally heating the edge seal to at least partially seal the discontinuity.

Further disclosed is a vacuum insulated glass unit including a first glass sheet, a second glass sheet, a plurality of spacers, and an edge seal. The second glass sheet is spaced apart from the first glass sheet. A gap is defined between the first glass sheet and the second glass sheet. The plurality of spacers are disposed on a first surface of at least one of the first glass sheet and the second glass sheet. The edge seal is disposed between the first glass sheet and the second glass sheet. The edge seal extends about a perimeter of at least one of the first glass sheet and the second glass sheet to seal the gap. The edge seal defines a discontinuity.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
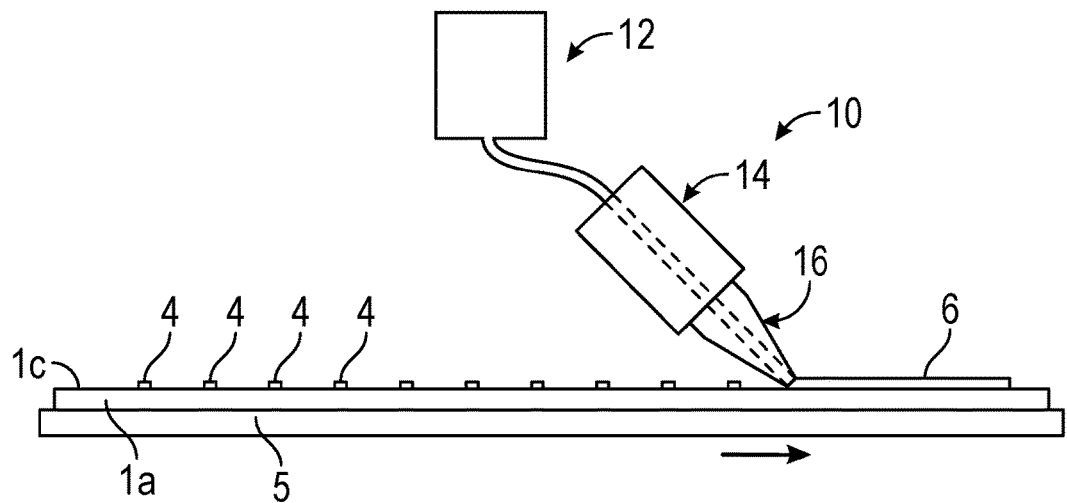
FIG. 1 is a view of a glass sheet having an edge seal being disposed upon a surface.
Figure 2:
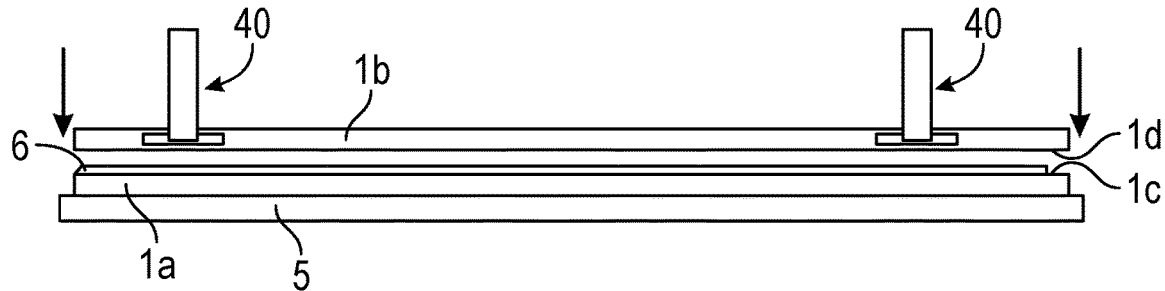
FIG. 2 is a view of another glass sheet being disposed over the glass sheet.
Figure 3:
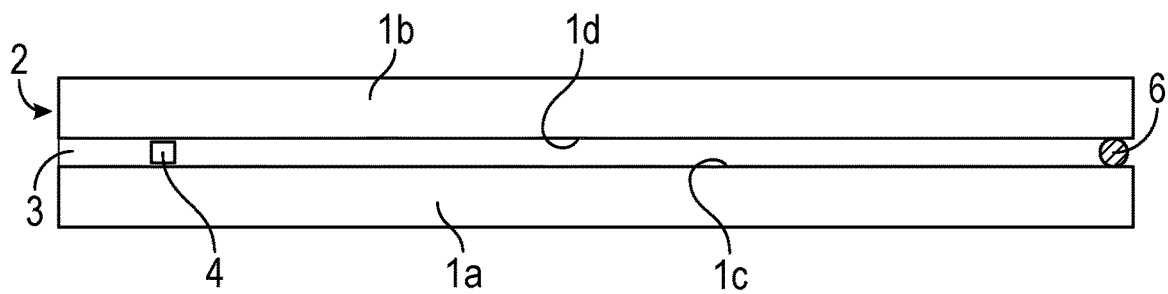
FIG. 3 is a view of a glass sheet assembly prior to evacuation.

A vacuum insulated glass unit is generally manufactured by a process as illustrated in the figures. A first glass sheet $1a$ and a second glass sheet $1b$ are assembled together to form a glass sheet assembly 2, as shown in FIGS. 1-3, having a gap 3, as shown in FIGS. 3-7, between facing surfaces $1c$, $1d$ of the first glass sheet $1a$ and the second glass sheet $1b$, respectively. The gap 3 may be formed by spacing apart the facing surface $1c$ of the first glass sheet $1a$ from the facing surface $1d$ of the second glass sheet $1b$ by a plurality of spacers 4. The gap 3 between facing surfaces $1c$, $1d$ of the first glass sheet $1a$ and the second glass sheet $1b$ may be within the range of 0.1 mm to 0.5 mm. The plurality of spacers 4 also facilitate maintaining the gap 3 between the facing surfaces $1c$, $1d$ of the first glass sheet $1a$ and the second glass sheet $1b$. As shown in FIG. 1, the plurality of spacers 4 are disposed on the facing surface $1c$ of the first glass sheet $1a$ that may be supported by a support surface 5. It is also contemplated that the plurality of spacers 4 may be disposed on the facing surface $1d$ of the second glass sheet $1b$ as well as or instead of on the facing surface $1c$ of the first glass sheet $1a$.

The gap 3 between facing surfaces $1c$, $1d$ of the first glass sheet $1a$ and the second glass sheet $1b$ may be at least partially sealed by an edge seal 6 and the gap 3 may be evacuated through a gap, opening, or discontinuity within the edge seal 6 to improve the insulating performance of the glass sheet assembly 2. The edge seal 6 is disposed on at least one of the facing surface $1c$ of the first glass sheet $1a$ and/or on the facing surface $1d$ of the second glass sheet $1b$. The edge seal 6 is disposed about a perimeter of at least one of the first glass sheet $1a$ and the second glass sheet $1b$.

Referring to FIG. 1, the edge seal 6 is applied to a facing surface of a glass sheet $1a$, $1b$. The edge seal 6 may be made of a first material that is applied by a dispensing system 10. The first material may be a solder glass material, a heated glass material, or other frit material having a melting point or melting temperature less than 500° C.

The dispensing system 10 may include a storage device 12 and a dispensing nozzle 16. The first material may be disposed within the storage device 12 and may be supplied to the dispensing nozzle 16 through the delivery unit 14. The delivery unit 14 includes a delivery tube 20 through which the first material passes and is applied to the facing surface of a glass sheet 1a, 1b through the dispensing nozzle 16. The first material may be applied to the facing surface of a glass sheet 1a, 1b as a paste that is subsequently heated to form the glassy edge seal. In at least one embodiment, the delivery unit 14 or the dispensing nozzle 16 may be provided with a heating arrangement that is arranged to heat and soften the first material prior to application to a facing surface of a glass sheet 1a, 1b.

Figure 4:
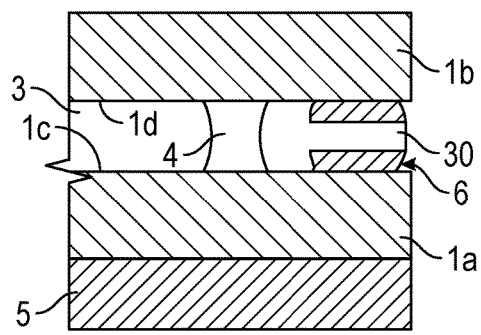
FIG. 4 is a partial view of the glass sheet assembly having an edge seal defining a discontinuity.

The edge seal 6 is disposed about the perimeter of a glass sheet 1a, 1b, and is spaced apart from the spacers 4. Referring to FIG. 4, the edge seal 6 may be applied such that a discontinuity 30 is at least partially defined by the edge seal 6. The discontinuity 30 may be arranged as a gap, slot, or opening that completely extends through the edge seal 6. In such an embodiment, the edge seal 6 may not be continuously applied about the perimeter of a glass sheet 1a, 1b, but instead the application of the edge seal 6 may be interrupted to define the discontinuity 30. In at least one embodiment, the discontinuity 30 may be formed or otherwise created within the edge seal 6 subsequent to application of the edge seal 6 by the insertion of a probe or other device through the edge seal 6.

The discontinuity 30 may have a height that is substantially equal to the height of the gap 3 between facing surfaces 1c, 1d of the first glass sheet 1a and the second glass sheet 1b. The discontinuity 30 may have a width that is within the range of 0.5 mm-6 mm. The height and the width of the discontinuity 30 are selected to achieve a predetermined or target conductance in order to achieve a predetermined or target evacuation time of the gap 3.

The discontinuity 30 may be arranged as a gap or opening that is defined between or defined by the edge seal 6, the facing surface 1c of the first glass sheet 1a, and the facing surface 1d of the second glass sheet 1b. The discontinuity 30 is arranged as an evacuation gap or evacuation opening that facilitates the evacuation of the gap 3 via a vacuum.

In the embodiments illustrated, the discontinuity 30 is an opening or a gap that is completely defined within the edge seal 6.

The discontinuity 30 may be formed within the edge seal 6 subsequent to the facing surface 1d of the second glass sheet 1b being positioned relative to the facing surface 1c of the first glass sheet 1a by automation equipment having a gripping arrangement 40 that grips the second glass sheet 1b, as shown in FIG. 2. The facing surface 1d of the second glass sheet 1b is disposed on the edge seal 6 and or the spacers 4 to maintain the gap 3 between the facing surfaces 1c, 1d of the first and second glass sheets 1a, 1b. The glass sheet assembly 2 having the edge seal 6 with the discontinuity 30 may be moved into a vacuum process chamber.

The edge seal 6 may or may not be heated by directing energy (e.g. infrared, microwave, laser, or the like) towards the edge seal 6 to at least partially fuse the edge seal 6 after the disposing of the second glass sheet 1b on the first glass sheet 1a. A device, such as a probe or a heated probe, may penetrate the edge seal 6 to define the discontinuity 30. Regardless of how the discontinuity 30 is formed, the discontinuity 30 is arranged as an evacuation gap, evacuation port, or evacuation opening that is fluidly connected to the gap 3 such that a vacuum may be applied to the gap 3 through the discontinuity 30. The discontinuity 30 defines a temporary pump-out port that does not extend through a surface 1c, 1d of either glass sheet 1a, 1b but is instead defined within the edge seal 6 and/or between the facing surfaces 1c, 1d of the glass sheets 1a, 1b.

Figure 5:
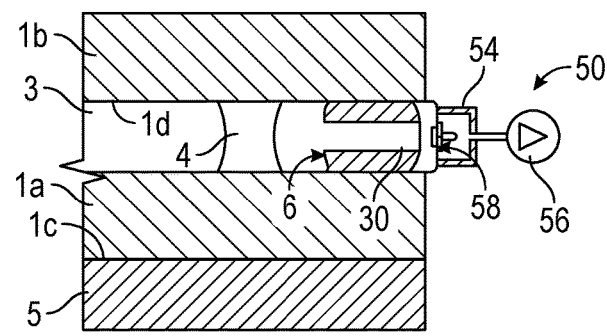
FIG. 5 is a partial view of the glass sheet assembly during evacuation of the gap.

Referring to the example of FIG. 5, the gap 3 is evacuated through the discontinuity 30 by an evacuation assembly 50 that may be disposed within the vacuum process chamber. The evacuation assembly 50 a sealing device 54 and a vacuum pump 56. The sealing device 54 may be a sealing cup, a gasket, other sealing member 58 that is disposed about or disposed over the discontinuity 30 to seal the discontinuity 30. The sealing device 54 fluidly connects the discontinuity 30 to the vacuum pump 56. In at least one embodiment, a fluid connector may be inserted into the discontinuity 30 and may extend at least partially into the gap 3. The fluid connector may be a probe that is fluidly connected to the vacuum pump 56. The vacuum pump 56 may apply a vacuum to the gap 3 through the discontinuity 30 to a predetermined pressure. The plurality of support structures 4 that are disposed between the first and second glass sheets 1a, 1b maintain the gap 3 between the first glass sheet 1a and the second glass sheet 1b while the vacuum is applied to the gap 3 through the discontinuity 30. Upon achieving the predetermined pressure, the evacuation assembly 50 may be disconnected.

Figure 6:
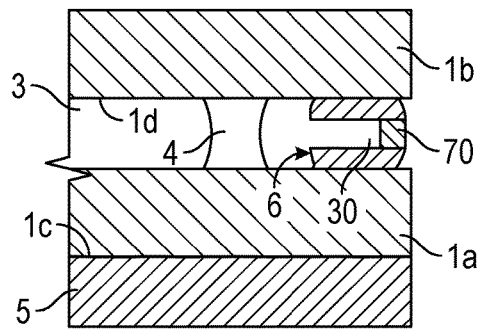
FIG. 6 is a partial view of the sealing of the discontinuity of the glass sheet assembly.

Referring to FIG. 6, the discontinuity 30 may be sealed by a seal 70. The seal 70 may be formed by: 1) disposing the first material into the discontinuity 30, 2) disposing a second material into the discontinuity 30, 3) disposing a physical plug or preformed seal into the discontinuity 30, or 4) locally heating the discontinuity 30. The second material may be similar or the same as the first material or may be different from the first material. The second material may be a metallic material such as indium, kovar, or other alloys or a solder glass material having a melting point greater than 500 C.

The first material or the second material may be disposed into the discontinuity 30 in molten form or in another state to form the seal 70 within the discontinuity 30. The disposing of a physical plug or preformed seal within or into the discontinuity 30 may necessitate disposing the first material or the second material about the physical plug or preformed seal to secure the physical plug or preformed seal within the discontinuity 30. Locally heating the edge seal 6 proximate the discontinuity 30 may cause the first material that comprises the edge seal 6 to flow into and fill the discontinuity 30 to form the seal 70 and seal the discontinuity 30. In one or more embodiments, the discontinuity consist essentially of the edge seal.

The discontinuity 30 may be sealed while the glass sheet assembly 2 is disposed within the vacuum process chamber and under vacuum. In such an arrangement, the first material or the second material may be applied using a molten device or other device that is also disposed within the vacuum process chamber to seal the discontinuity 30.

In one or more embodiment, the first material or the second material may be applied by a dispensing system. In one or more embodiments, the dispensing system is as disclosed above. In one or more embodiments, the first material or the second material may be applied using a molten applicator. In one or more embodiments, the molten applicator comprises a dispensing nozzle where the first material or the second material may be forced through the dispensing nozzle outlet by means of a pressure arrangement. In at least one embodiment, the dispensing nozzle may be provided with a heating arrangement that is arranged to heat and soften the first material or the second material prior to application. This may provide an extrusion solution where a controlled flow of heated and softened material may be obtained. In one or more embodiments, the pressure arrangement may be configured to provide a pressure between 0.1 and 6 bar, such as between 0.4 and 4 bar, e.g. between 0.2 to 2 bar to the heated, softened material so as to force it through the dispensing nozzle outlet.

Figure 7:
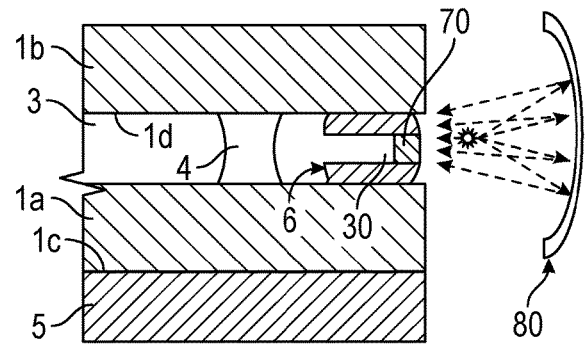
FIG. 7 is a partial view of the final sealing of the discontinuity of the glass sheet assembly.

Referring to FIG. 7, to ensure that the seal 70 is joined to the edge seal 6 to seal the discontinuity 30 the edge seal 6 and/or the seal 70 may be locally heated by a heating device 80. The heating device 80 may be a laser, a microwave heater, radiative heater, an infrared heater that is arranged to heat the edge seal 6 and the seal 70 to fuse or join the edge seal 6 and the seal 70 together. The heating device 80 may be disposed within the vacuum process chamber and may heat the edge seal 6 while under vacuum.

The integrally formed pump out port provided by the discontinuity 30 formed within the edge seal 6 avoids the use of ports or features on a vision area of the window. The discontinuity 30 also provides a more robust pump out feature by eliminating any additional parts that may be damaged or jostled and affect the sealing of the edge seal 6. The discontinuity 30 provides a more durable pump out feature that is protected between the glass panes instead of being exposed as would a pump out port present on the glass pane or vision area.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention is further described in the following items.

1. A method of manufacturing a glass sheet assembly for a vacuum insulated glass unit, comprising:
    applying an edge seal made of a first material to a perimeter of a first surface of a first glass sheet, the edge seal defining a discontinuity;
    disposing a plurality of support structures on the first surface of the first glass sheet; and
    positioning a first surface of a second glass sheet relative to the first surface of the first glass sheet, such that the first surface of the second glass sheet engages the edge seal defining the discontinuity and a gap is defined between the first surface of the first glass sheet and the first surface of the second glass sheet, the discontinuity being fluidly connected to the gap.
2. The method of any preceding item, wherein the first material is a heated glass material.
3. The method of any preceding item, wherein the first material is a solder glass material.
4. The method of any preceding item, wherein applying the edge seal is interrupted to define the discontinuity.
5. The method of any preceding item, wherein the discontinuity is having a height that is substantially equal to the height of the gap.
6. The method of any preceding item, wherein the discontinuity is arranged as a gap, slot, or an opening that extends completely through the edge seal.
7. The method of any preceding item, wherein the discontinuity is arranged as an evacuation opening that extends completely through the edge seal.
8. The method of any preceding item, further comprising: evacuating the gap to a predetermined pressure through the discontinuity.
9. The method of any preceding item, further comprising: sealing the discontinuity, preferably sealing the discontinuity in the vacuum process chamber and under vacuum.
10. The method of any preceding item, wherein sealing the discontinuity includes disposing at least one of the first material or a second material in the discontinuity.
11. The method of any preceding item, wherein sealing the discontinuity includes disposing at least one of the first material or a second material in a molten form in the discontinuity.
12. The method of any preceding item, wherein the first material or the second material is applied using a molten device.
13. The method of item 12, wherein the molten device is a molten solder applicator.
14. The method of any preceding item, wherein the second material is at least one of a metallic material and a solder glass material.
15. The method of any preceding item, wherein sealing the discontinuity includes: locally heating the edge seal proximate the discontinuity to encourage a flow of the first material into the discontinuity.
16. The method of any preceding item, wherein the local heating is conducted by a heating device.
17. The method of any preceding item, wherein the heating device is selected from a laser, a microwave heater, a radiative heater or an infrared heater.
18. A method of manufacturing a glass sheet assembly for a vacuum insulated glass unit, comprising:
    applying an edge seal made of a first material to a perimeter of a first surface of a first glass sheet, the edge seal defining a discontinuity;
    disposing a first surface of a second glass sheet on the edge seal such that a gap is defined between the first surface of the first glass sheet and the first surface of the second glass sheet;
    evacuating the gap through the discontinuity; and
    locally heating the edge seal to at least partially seal the discontinuity.
19. The method of item 18, wherein evacuating the gap includes: applying a vacuum to the gap through the discontinuity.
20. The method of any preceding items 18 to 19, further comprising: disposing the glass sheet assembly in a vacuum process chamber.
21. The method of item 20, wherein the discontinuity is sealed while the glass sheet assembly is disposed within the vacuum process chamber.
22. The method of any preceding items 18 to 21, further comprising: disposing at least one of the first material, a second material, or a preformed seal in the discontinuity.
23. The method of any preceding items 18 to 21, wherein the at least one of the first material or a second material is applied in a molten form in the discontinuity.
24. The method of any preceding items 18 to 23, wherein the first material or the second material is applied using a molten device.
25. The method of item 24, wherein the molten device is a molten solder applicator.
26. The method of any preceding items 18 to 25, wherein the first material is a solder glass material.

27. The method of any preceding items 18 to 26, wherein applying the edge seal is interrupted to define the discontinuity.
28. The method of any preceding items 18 to 27, wherein the discontinuity is having a height that is substantially equal to the height of the gap.
29. The method of any preceding items 18 to 28, wherein the discontinuity is arranged as a gap, slot, or an opening that extends completely through the edge seal.
30. The method of any preceding items 18 to 29, further comprising: locally heating the edge seal and at least one of the first material, the second material, or the preformed seal.
31. The method of any preceding items 18 to 30, wherein the local heating is conducted by a heating device.
32. The method of item 31, wherein the heating device is selected from a laser, a microwave heater, a radiative heater or an infrared heater.
33. A vacuum insulated glass unit, comprising:
    a first glass sheet;
    a second glass sheet spaced apart from the first glass sheet, a gap being defined between the first glass sheet and the second glass sheet;
    a plurality of spacers disposed on a first surface of at least one of the first glass sheet and the second glass sheet; and
    an edge seal disposed between the first glass sheet and the second glass sheet, the edge seal extending about a perimeter of at least one of the first glass sheet and the second glass sheet to seal the gap, the edge seal defining a discontinuity.
34. The vacuum insulated glass unit of item 33, further comprising: a seal disposed within the discontinuity.
35. The vacuum insulated glass unit of any preceding items 33 to 34, wherein the edge seal is made of a first material and the seal is made of a second material.
36. The vacuum insulated glass unit of any preceding items 33 to 34, wherein the edge seal is made of a first material and the seal is made of the first material.
37. The vacuum insulated glass unit of any preceding items 33 to 36, wherein the seal is joined to the edge seal by locally heating the edge seal and the seal.

The invention claimed is:
1. A method of manufacturing a glass sheet assembly for a vacuum insulated glass unit, comprising:
    applying an edge seal made of a first material to a perimeter of a first surface of a first glass sheet,
    interrupting said applying of the edge seal to define a discontinuity;
    disposing a first surface of a second glass sheet on the edge seal such that the discontinuity extends completely through the edge seal, and such that a gap is defined between the first surface of the first glass sheet and the first surface of the second glass sheet;
    evacuating the gap to a predetermined pressure through the discontinuity;
    and
    locally heating the edge seal proximate the discontinuity to encourage a flow of the first material into the discontinuity to seal the discontinuity, the discontinuity is sealed while the glass sheet assembly is disposed within a vacuum process chamber and under vacuum;
    wherein the local heating is conducted by a laser; and
    wherein the discontinuity has a height that is substantially equal to a height of the gap.
2. The method of claim 1, comprising disposing a plurality of spacers to at least one of the first surfaces of the first glass sheet or the second glass sheet.
3. The method of claim 1, wherein the first material is a solder glass material.
4. The method of claim 1, wherein the discontinuity is a gap that is completely defined within the edge seal.
5. The method of claim 1, wherein the discontinuity has a height equal to a height of the gap.
6. The method of claim 1, wherein the discontinuity is defined between the first surface of the first glass sheet and the first surface of the second glass sheet.
7. The method of claim 1, wherein a width of the discontinuity is between 0.5 to 6 mm.
8. The method of claim 1, wherein the edge seal is heated by laser to fuse the edge seal after the disposing of the second glass sheet on the first glass sheet.

* * * * *